United States Patent
Bouillet

(10) Patent No.: US 7,366,265 B2
(45) Date of Patent: Apr. 29, 2008

(54) SYSTEM FOR DETECTING THE CHARACTERISTICS OF A TIME VARYING MULTIPATH COMPONENT

(75) Inventor: Aaron Reel Bouillet, Noblesville, IN (US)

(73) Assignee: Thomson Licensing, Boulogne, Billancourt (FR)

(*) Notice: Subject to any disclaimer, the term of this patent is extended or adjusted under 35 U.S.C. 154(b) by 597 days.

(21) Appl. No.: 10/232,789

(22) Filed: Aug. 29, 2002

(65) Prior Publication Data

US 2004/0042571 A1 Mar. 4, 2004

(51) Int. Cl.
*H04B 7/10* (2006.01)
(52) U.S. Cl. ...................................... 375/347
(58) Field of Classification Search ............... 375/347, 375/261, 142; 342/159
See application file for complete search history.

(56) References Cited

U.S. PATENT DOCUMENTS

| | | | |
|---|---|---|---|
| 5,065,242 A | 11/1991 | Dieterich | |
| 5,900,835 A * | 5/1999 | Stein | 342/159 |
| 6,069,912 A * | 5/2000 | Sawahashi et al. | 375/142 |
| 6,298,100 B1 | 10/2001 | Bouillet | |
| 6,505,348 B1 | 1/2003 | Knowles et al. | |
| 6,963,649 B2 * | 11/2005 | Vaudrey et al. | 381/94.7 |
| 7,035,339 B2 * | 4/2006 | Chiou | 375/261 |
| 7,120,192 B2 * | 10/2006 | Kumura | 375/148 |
| 2004/0042571 A1 | 3/2004 | Bouillet | |

FOREIGN PATENT DOCUMENTS

EP 0 759 872 2/1997

OTHER PUBLICATIONS

European Search Report.

* cited by examiner

*Primary Examiner*—Chieh M. Fan
*Assistant Examiner*—Jaison Joseph
(74) *Attorney, Agent, or Firm*—Joseph J. Laks; Paul P. Kiel

(57) ABSTRACT

A system for receiving a composite signal including a main component and a multipath component includes a demodulator chain having adaptive circuitry controllable in response to a control signal to compensate for the multipath component. In this system, a control signal generator includes a phase error estimator, which generates a signal representing an estimate of the phase error between the received main component and the received multipath component. A controller generates the control signal in responsive to the phase error signal.

15 Claims, 1 Drawing Sheet

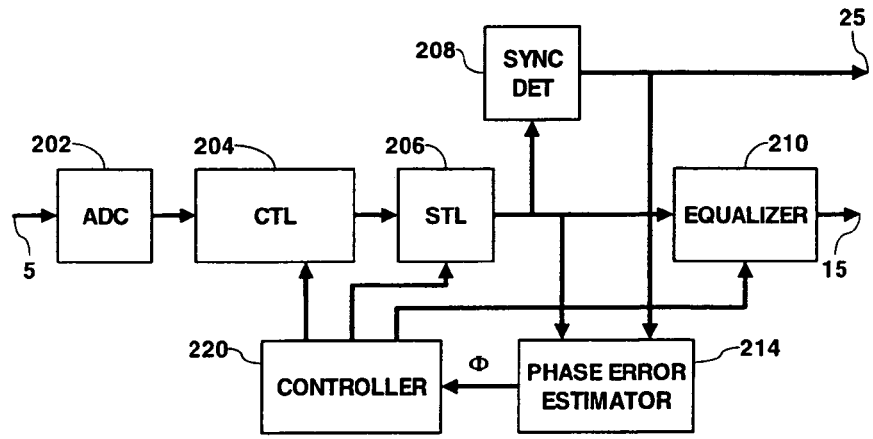
Fig. 1 - System
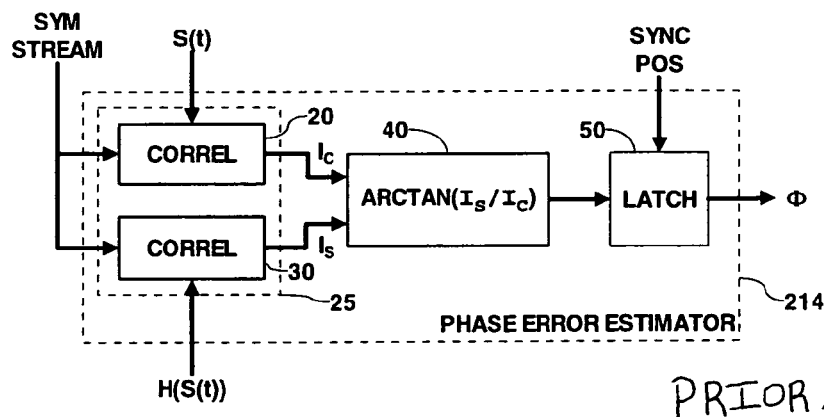
Fig. 2 – Estimator
PRIOR ART
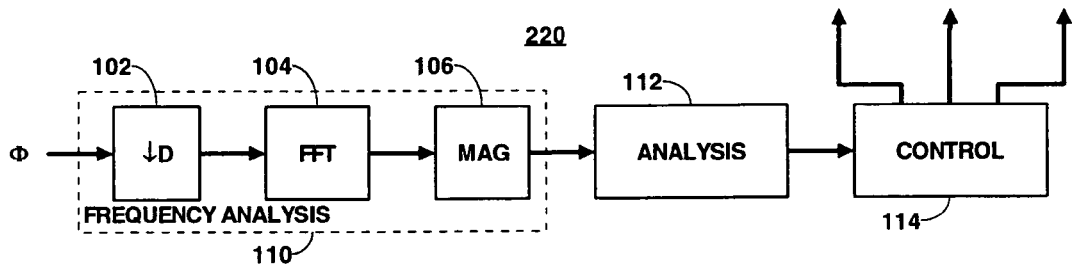
Fig. 3 - Controller

SYSTEM FOR DETECTING THE CHARACTERISTICS OF A TIME VARYING MULTIPATH COMPONENT

BACKGROUND

The present invention relates to circuitry in a communications receiver for compensating for the presence of a time varying multipath component in the received signal, and in particular to a system for detecting the characteristics of the time varying multipath component.

In terrestrial broadcast communications systems, signals from a transmitting antenna often arrive at a receiving antenna not only via a direct path from the transmitting antenna to the receiving antenna, but also via one or more other paths due to reflections off of objects in the broadcast area. Signals resulting from such reflections are termed multipath signals. Such objects may be fixed in location, such as buildings, producing a fixed multipath signal. Such objects may also be moving, such as airplanes. Moving objects present more problems because the magnitude and phase of the multipath signal components from such objects vary over time, sometimes relatively rapidly.

When one or more multipath components are present in a received signal, the carrier received by the receiver and tracked by the demodulator is a composite signal formed from the main signal component which traveled the direct path, combined with the reflected multipath signal components. However, the multipath components usually have different phases and magnitudes than the main path component, and, for moving objects, the phase and magnitude difference is time-varying, due to, for example, the Doppler-shift effect. These phase and magnitude differences can adversely affect the signal processing performed in the receiver. Some receiver systems include circuitry for compensating for received signals including a multipath component.

More specifically, each receiver includes a chain of processing circuitry for demodulating the signal modulated on the carrier. Each of the processing circuits in the demodulator chain may include adaptive circuitry which may be controlled to compensate for the presence of multipath components in the received signal. For example, in a high definition television (HDTV) receiver, the demodulator chain may include the known arrangement of a carrier tracking loop (CTL), symbol timing recovery loop (STL), equalizer, and so forth, each including adaptive circuitry (carrier tracking bandwidth, symbol timing recovery bandwidth, equalizer bandwidth, etc.) controlled to compensate for the presence of multipath components. For the adaptive circuitry to operate properly, it must receive a control signal which identifies the characteristics of the received multipath components accurately and in a timely manner.

Prior art multipath compensating systems derived the control signal by monitoring the bit error rate of the output signal of the demodulator chain as the adaptive circuitry was adjusted to different settings. The setting that resulted in the minimum bit error rate was then used to set the value of the control signal for the demodulator chain. However, this process is slow and not easily adaptable to fast varying multipath components. In addition, as the settings for the adaptive circuitry in the demodulator chain are varied to find the optimum setting, it is possible for the output of the demodulator chain to experience a relatively high bit error rate, which degrades the subsequent signal processing and becomes perceived by the user. For example, in an HDTV receiver, this process may introduce artifacts into the image represented by the video component, and/or noise into the sound represented by the audio component, of the received signal which will be perceived by the user.

A system of deriving a control signal for the adaptive circuitry in the demodulator chain which operates quickly and does not result in perceived degradation of the received signal is desirable.

SUMMARY OF THE INVENTION

In accordance with principles of the present invention, a system for receiving a composite signal including a main component and a multipath component includes a demodulator chain having adaptive circuitry controllable in response to a control signal to compensate for the multipath component. In this system, a control signal generator includes a phase error estimator, which generates a signal representing an estimate of the phase error between the received composite component and the received main component. A controller generates the control signal in responsive to the phase error signal.

A system according to the present invention will compensate for multipath signals by producing a control signal for the adaptive circuitry in the demodulator chain from an estimate of the phase difference between the composite without the time consuming task of repeatedly making adjustments in the adaptive circuitry and measuring the bit rate until the adjustments are optimized, as in the prior art system.

BRIEF DESCRIPTION OF THE DRAWING

In the drawing:

FIG. 1 is a block diagram of a portion of a receiver including a control signal generator in accordance with principles of the present invention;

FIG. 2 is a more detailed block diagram of a phase error estimator which may be used in the control signal generator of FIG. 1; and FIG. 3 is a more detailed block diagram of a controller which may be used in the control signal generator of FIG. 1.

DETAILED DESCRIPTION

FIG. 1 is a block diagram of a portion of a receiver including a control signal generator in accordance with principles of the present invention. In FIG. 1, only those elements necessary to understand the construction and operation of the invention are illustrated. One skilled in the art will understand what other elements are necessary, and how to design, construct, and interconnect those elements with those illustrated to make a complete operational receiver.

In FIG. 1, an input terminal 5 is coupled to a front end (not shown) of a receiver. This front end may include an RF amplifier, detector, and IF amplifier, of known design. The input terminal 5 is coupled to the serial connection of an analog-to-digital converter (ADC) 202, a carrier tracking loop (CTL) 204, a symbol timing loop (STL) 206 and an equalizer 210. An output terminal of the equalizer 210 is coupled to an output terminal 15. The output terminal 15 is coupled to a back end (not shown) of the receiver. This back end may include a phase tracking loop, trellis decoder, data de-interleaver, Reed-Solomon decoder, descrambler, and audio and video processors, of known design.

The output terminal of the STL 206 is also coupled to an input terminal of a synchronization signal detector 208 and a signal input terminal of a phase error estimator 214. An output terminal of the synchronization detector 208 generates synchronization signals and is coupled to a sync signal input terminal of the phase error estimator 214 and an output terminal 25. The output terminal 25 is coupled to the other elements in the receiver, including those illustrated in FIG. 1, (not shown to simplify the figure). An output terminal of the phase error estimator 214 is coupled to an input terminal of a controller 220. Respective output terminals of the controller 220 are coupled to corresponding control input terminals of the CTL 204, STL 206 and equalizer 210.

In operation, the ADC 202, CTL 204, STL 206, equalizer 210 and synchronization detector 208 operate in conjunction with the receiver front end and back end (not shown) in a known manner to receive a modulated signal, and to extract, process and utilize the modulating signal. For example, in an HDTV receiver, the receiver receives a carrier modulated by a television signal, and displays an image represented by the video component of the television signal and generates sound represented by the audio component of the television signal, all in a known manner. However, as described above, the received carrier includes a main component which is transmitted directly from the transmitting antenna to the receiving antenna, and possibly one or more multipath components which are reflected off of near-by objects such as buildings or airplanes. The multipath components have phases which differ from the phase of the main component. This results in a received composite signal having a carrier component with a phase which also differs from the phase of the carrier component of the main signal.

The STL 206 generates a symbol stream, representing the transmitted digital television signal. The symbol stream contains successive frames, each frame including two fields. Each field, in turn, contains 313 segments, each segment including 832 symbols. Each segment begins with a four symbol segment synchronization sequence having a known fixed value, followed by 828 other symbols. The synchronization detector 208 receives the symbol stream, and generates synchronization signals, including a segment synchronization position signal which is active when the segment synchronization symbol sequence is present at the output of the STL 206.

The phase error estimator 214 is responsive to the symbol stream from the STL 206 and the segment synchronization position signal from the synchronization detector 208 and generates a phase error signal $\phi$ representing an estimate of the phase error between the carrier component of the received composite signal and the carrier component of the main (direct) component in a manner to be described in more detail below. The phase error signal $\phi$ provides an indication of the characteristics of the received multipath component. The controller 220 analyzes the phase error signal $\phi$ in a manner to be described in more detail below and generates respective control signals that will condition the adaptive circuitry in the demodulator elements (CTL 204, STL 206 and equalizer 210) to accurately compensate for the multipath components.

FIG. 2 is a more detailed block diagram of a phase error estimator 214 which may be used in the control signal generator of FIG. 1. The phase error estimator 214 illustrated in FIG. 2 is similar to that disclosed in U.S. Pat. No. 6,298,100 issued Oct. 2, 2001 to Bouillet, which is incorporated by reference herein. In FIG. 2, the symbol stream signal from the STL 206 (of FIG. 1) is coupled to respective input terminals of a first correlator 20 and a second correlator 30. A signal S(t), representing the known fixed value of the segment synchronization sequence, is coupled to a second input terminal of the first correlator 20. A signal H(S(t)), which is the Hilbert transform of the signal S(t) and represents a signal in quadrature with the segment synchronization sequence S(t), is coupled to a second input terminal of the second correlator 30. An output terminal $I_C$ of the first correlator 20 is coupled to a first input terminal of an arc tangent (arctan) calculating circuit 40 and an output terminal $I_S$ of the second correlator 30 is coupled to a second input terminal of the arctan calculating circuit 40. An output terminal of the arctan calculating circuit 40 is coupled to an input terminal of a latch 50. A clock input terminal of the latch 50 is coupled to receive the segment synchronization position signal (SYNC POS) from the synchronization detector 208 (of FIG. 1). An output terminal of the latch 50 generates the phase error estimate signal $\phi$ and is coupled to the controller 220 (of FIG. 1).

In operation, the symbols in the symbol stream are continually correlated with the in-phase and quadrature representations of the segment synchronization sequence, S(t) and H(S(t)), in the first and second correlators 20 and 30, respectively. During the segment synchronization sequence intervals, the result $I_C$ from the first correlator 20 is proportional to cos $\phi$ with a known, constant proportionality constant and the result $I_S$ from the second correlator 30 is proportional to sin $\phi$ also with a known, constant proportionality constant. The ratio $I_S/I_C$, therefore, is proportional to tan $\phi$. Because the proportionality constants are known and constant, they may be properly compensated for. Therefore, the arctan of this ratio, compensated for the proportionality constants, generated by the arctan generating circuit 40 is the phase error estimate $\phi$. The latch 50 latches the phase error estimate $\phi$ at the end of the segment synchronization sequence interval, all in a manner known from the above mentioned U.S. patent.

FIG. 3 is a more detailed block diagram of a controller 220 which may be used in the control signal generator of FIG. 1. In FIG. 3, an input terminal receiving the phase error estimate signal $\phi$ is coupled to the serial connection of a decimator 102, a fast Fourier transform (FFT) circuit 104, magnitude calculating circuit 106, analysis circuit 112 and control circuit 114. Respective output terminals of the control circuit 114 are coupled to the corresponding control input terminals of the CTL 204, STL 206 and equalizer 210 (of FIG. 1).

As described above, the elements in the demodulator chain (CTL 204, STL 206 and equalizer 210) include adaptive circuitry which is controlled in response to a control signal, to compensate for the multipath component. In operation, the controller 220 analyzes the frequency content of the phase error signal $\phi$ to characterize the multipath component represented by that signal. The frequency content of the phase error signal $\phi$ is determined by a frequency analysis circuit 110 formed by the combination of the decimator 102, FFT circuit 104 and magnitude calculating circuit 106. The magnitude calculating circuit 106 calculates either the magnitude or magnitude squared of each complex element in the vector of frequency components generated by the FFT circuit 104. Although illustrated as using an FFT circuit 104, one skilled in the art will understand that the frequency analysis circuit may use any circuitry for generating signals representing the magnitude of the phase error signal $\phi$ at a plurality of respective frequencies in the passband of interest.

The analysis circuit 112 determines if any frequency component, or any function of one or more frequency components, exceeds an acceptable threshold for the current settings of the adaptive circuitry in the demodulator chain (CTL 204, STL 206 and equalizer 210. One skilled in the art will understand how to select the frequency components, and how to derive the functions of the frequency components and the thresholds to be applied to them for any current setting of the adaptive circuitry in the demodulator chain.

If any threshold is exceeded, then the adaptive circuitry in the demodulator chain is controlled to decrease that component or set of components in such a manner as to bring that component or set of components below the threshold. The analysis circuit 112 supplies a signal to the control circuit 114 specifying the results of its analysis. The control circuit 114, in response, supplies control signals to the adaptive circuitry in the demodulator chain (CTL 204, STL 206, and equalizer 210) conditioning that circuitry to reduce the frequency component, or function of one or more frequency components of the multipath signal so that the threshold is no longer exceeded.

The controller 220 of FIG. 1 and FIG. 3 is illustrated as discrete circuit elements. However, one skilled in the art will understand that all, or some parts, of the controller 220 may be implemented by a programmable controller directed by a control program.

The invention claimed is:

1. In a system for receiving a composite information modulated carrier signal comprising a main signal modulated carrier component which travels a direct path to said receiving system and a multipath signal modulated carrier component which travels a reflected path to said receiving system, including a demodulator chain having adaptive circuitry controllable in response to a control signal to compensate for the multipath component, a control signal generator, comprising:
   a phase error estimator, for generating a phase error signal representing an estimate of the phase error between the information modulated composite carrier signal and the main signal modulated carrier component; and
   a controller, responsive to the phase error signal ,for generating said control signal wherein said controller comprises:
   a frequency analysis circuit responsive to said phase error signal for generating frequency components representing the magnitudes of the phase error signal at each of a plurality of respective frequencies;
   an analysis circuit for comparing frequency components of said phase error signal to threshold values; and
   a control circuit responsive to said comparison for generating said control signal.

2. The system of claim 1 wherein said phase error estimator comprises:
   a phase error estimator for generating a phase error signal representing an estimate of the phase error between the composite signal and the main component resulting from presence of said multipath component.

3. The system of claim 2 wherein the frequency analysis circuit comprises a discrete Fourier transform circuit.

4. The system of claim 3 wherein the discrete Fourier transform circuit comprises a fast Fourier transform circuit.

5. In a system for receiving a composite signal including a main component and a multipath component, including a demodulator chain having adaptive circuitry controllable in response to a control signal to compensate for the multipath component, a control signal generator, comprising:
   a phase error estimator, for generating a signal representing an estimate of the phase error between the composite signal and the main component; and
   a controller, responsive to the phase error signal ,for generating said control signal wherein said controller comprises:
   a frequency analysis circuit responsive to said phase error signal for determining frequency components of the phase error signal;
   an analysis circuit for comparing frequency components of said phase error signal to threshold values; and
   a control circuit responsive to said comparison for generating said control signal;
   wherein the frequency analysis circuit comprises a discrete Fourier transform circuit; and
   wherein the frequency analysis circuit further comprises a decimator, responsive to the phase error signal, and coupled to the discrete Fourier transform circuit.

6. The system of claim 5 wherein the frequency analysis circuit further comprises a magnitude determining circuit, responsive to the discrete Fourier transform circuit.

7. The system of claim 5 wherein the frequency analysis circuit further comprises a magnitude-squared determining circuit, responsive to the discrete Fourier transform circuit.

8. The system of claim 5 wherein the analysis circuit comprises circuitry for comparing the magnitudes of respective frequency components from the discrete Fourier transform circuit to corresponding threshold values.

9. In a system for receiving a composite signal including a main component and a multipath component, including a demodulator chain having adaptive circuitry controllable in response to a control signal to compensate for the multipath component, a control signal generator, comprising:
   a phase error estimator, for generating a signal representing an estimate of the phase error between the composite signal and the main component; and
   a controller, responsive to the phase error signal ,for generating said control signal wherein said controller comprises:
   a frequency analysis circuit responsive to said phase error signal for determining frequency components of the phase error signal;
   an analysis circuit for comparing frequency components of said phase error signal to threshold values; and
   a control circuit responsive to said comparison for generating said control signal;
   wherein the frequency analysis circuit comprises a discrete Fourier transform circuit;
   wherein the analysis circuit comprises circuitry for comparing the magnitudes of respective frequency components from the discrete Fourier transform circuit to corresponding threshold values; and
   wherein the threshold values depend on the current state of the adaptive circuitry.

10. The system of claim 8 wherein the analysis circuit comprises circuitry for comparing a function of one or more of the magnitudes of respective frequency components from the discrete Fourier transform circuit to corresponding threshold values.

11. The system of claim 10 wherein the threshold values depend on the current state of the adaptive circuitry.

12. The system of claim 5 wherein the analysis circuit comprises circuitry for comparing the magnitudes-squared of respective frequency components from the discrete Fourier transform circuit to corresponding threshold values.

13. The system of claim 12 wherein the threshold values depend on the current state of the adaptive circuitry.

14. The system of claim 12 wherein the analysis circuit comprises circuitry for comparing a function of one or more of the magnitudes of respective frequency components from the discrete Fourier transform circuit to corresponding threshold values.

15. The system of claim 14 wherein the threshold values depend on the current state of the adaptive circuitry.

* * * * *